United States Patent
Bance et al.

(10) Patent No.: US 10,388,307 B1
(45) Date of Patent: Aug. 20, 2019

(54) MAGNETIC WRITE TRANSDUCER WITH FIRST AND SECOND POLE SECTIONS

(71) Applicant: Seagate Technology LLC, Cupertino, CA (US)

(72) Inventors: Simon Bance, St. Albans (GB); Choon How Gan, Derry (GB); Mark Anthony Gubbins, Letterkenny (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/956,855

(22) Filed: Apr. 19, 2018

Related U.S. Application Data

(60) Provisional application No. 62/487,642, filed on Apr. 20, 2017.

(51) Int. Cl.
   *G11B 5/31* (2006.01)
   *G11B 5/60* (2006.01)
   *G11B 5/00* (2006.01)

(52) U.S. Cl.
   CPC .......... *G11B 5/3116* (2013.01); *G11B 5/6088* (2013.01); *G11B 2005/0021* (2013.01)

(58) Field of Classification Search
   None
   See application file for complete search history.

(56) References Cited

U.S. PATENT DOCUMENTS

| | | | |
|---|---|---|---|
| 6,029,334 A * | 2/2000 | Hartley | B21D 39/021 29/464 |
| 8,264,792 B2 | 9/2012 | Bai et al. | |
| 8,310,901 B1 * | 11/2012 | Batra | G11B 5/1278 369/112.27 |
| 8,537,494 B1 * | 9/2013 | Pan | G11B 5/1278 360/125.04 |
| 8,873,351 B1 * | 10/2014 | Aoki | G02B 6/1226 369/112.27 |
| 9,019,659 B1 | 4/2015 | Yin et al. | |
| 9,218,841 B1 * | 12/2015 | Moriya | G11B 13/08 |
| 9,721,591 B1 * | 8/2017 | Liu | G11B 5/3109 |
| 10,106,885 B2 * | 10/2018 | Tanner | G11B 5/3116 |
| 10,115,416 B2 * | 10/2018 | Liu | G11B 5/3109 |
| 10,204,644 B1 | 2/2019 | Benakli et al. | |
| 2006/0262453 A1 * | 11/2006 | Mochizuki | G11B 5/1278 360/125.03 |
| 2011/0222188 A1 | 9/2011 | Etoh et al. | |
| 2011/0273800 A1 | 11/2011 | Takano et al. | |

(Continued)

FOREIGN PATENT DOCUMENTS

JP 2013004122 A * 1/2013

*Primary Examiner* — William J Klimowicz
(74) *Attorney, Agent, or Firm* — Hollingsworth Davis, LLC

(57) ABSTRACT

A recording head has a magnetic write transducer proximate a side of a plasmonic gap waveguide. The magnetic write transducer has a first write pole section that tapers in a crosstrack direction and downtrack direction to form a tapered tip. The first write pole section includes a high-moment, seed layer on one side. A second write pole section is coupled to the first write pole section. The second write pole section extends a second distance away from the media-facing surface less than that of the first write pole section. A tip of the second write pole section is tapered in the crosstrack and downtrack directions.

19 Claims, 8 Drawing Sheets

(56) References Cited

U.S. PATENT DOCUMENTS

| | | |
|---|---|---|
| 2014/0063648 A1 | 3/2014 | Shiroishi et al. |
| 2014/0285919 A1 | 9/2014 | Tanaka et al. |
| 2015/0235658 A1* | 8/2015 | Cao ........................ G11B 5/314 |
| | | 369/13.33 |
| 2016/0225390 A1 | 8/2016 | Saito |
| 2018/0137881 A1* | 5/2018 | Miyata ................ G11B 5/3106 |

* cited by examiner

MAGNETIC WRITE TRANSDUCER WITH FIRST AND SECOND POLE SECTIONS

RELATED PATENT DOCUMENTS

This application claims the benefit of Provisional Patent Application No. 62/487,642 filed on Apr. 20, 2017, which is incorporated herein by reference in its entirety.

SUMMARY

The present disclosure is directed to a magnetic write transducer with first and second pole sections. In one embodiment, a recording head has a plasmonic gap waveguide with first and second substrate-parallel sides offset downtrack from one another at a media-facing surface of the recording head. A magnetic write transducer is proximate the first substrate parallel side of the plasmonic gap waveguide. The magnetic write transducer includes a first write pole section that tapers in a crosstrack direction and downtrack direction to form a tapered tip. The first write pole section includes a high-moment, seed layer on one substrate-parallel side. The first write pole section extends a first distance away from the media-facing surface. A gap is located between the tapered tip and the media-facing surface.

The write transducer includes a second write pole section coupled to the first write pole section. The second write pole section extends a second distance away from the media-facing surface. The second distance is at least ⅕ that of the first distance. A tip of the second write pole section is located proximate the media facing surface and is tapered in the crosstrack direction and the downtrack direction.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. Drawings are not necessarily to scale.

DETAILED DESCRIPTION

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into a hotspot in a recording layer. The hotspot raises the media temperature locally, reducing the writing magnetic field required for high-density recording. A waveguide integrated into a read/write head delivers light to the near-field transducer and excites the near-field transducer. In response, the near-field transducer achieves surface plasmon resonance and tunnels a stream of surface plasmons to heat the recording medium. A magnetic transducer, which includes a magnetic write pole, applies a magnetic field to the hotspot, locally changing magnetic orientation within the hotspot, while regions outside the hotspot are not affected by the applied field. In the following disclosure below, a magnetic transducer is described that can increase magnetic field strength. This magnetic transducer is designed to work together with a particular near-field transducer to enable higher areal data density.

Figure 1:
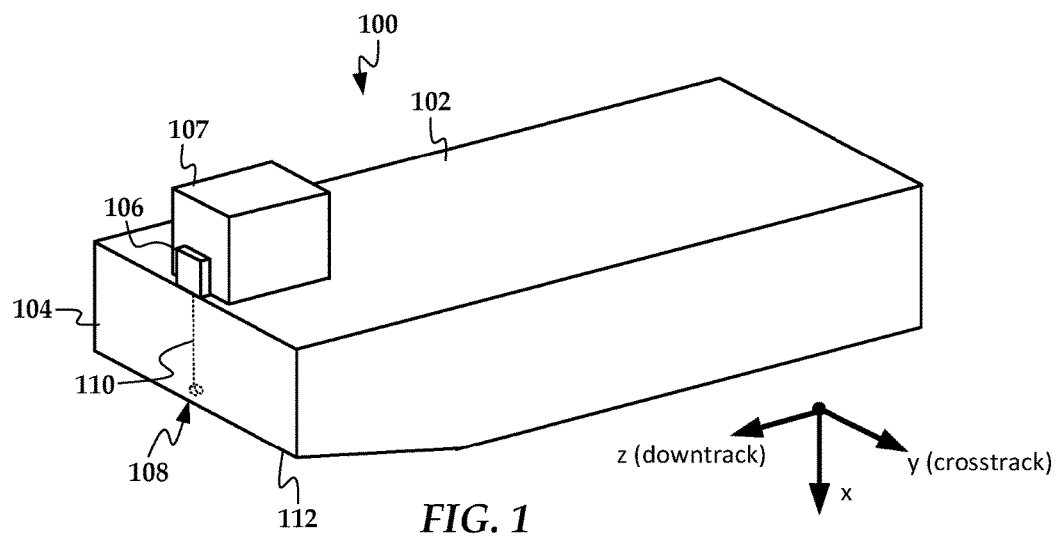
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode 106 mounted on submount 107) and a waveguide 110. The waveguide 110 delivers electromagnetic energy from the energy source 106 to a near-field transducer that is part of the read/write transducers 108. The near-field transducer achieves surface plasmon resonance in response and directs the energy out of a media-facing surface 112 to create a small hot spot on the recording medium.

Figure 2:
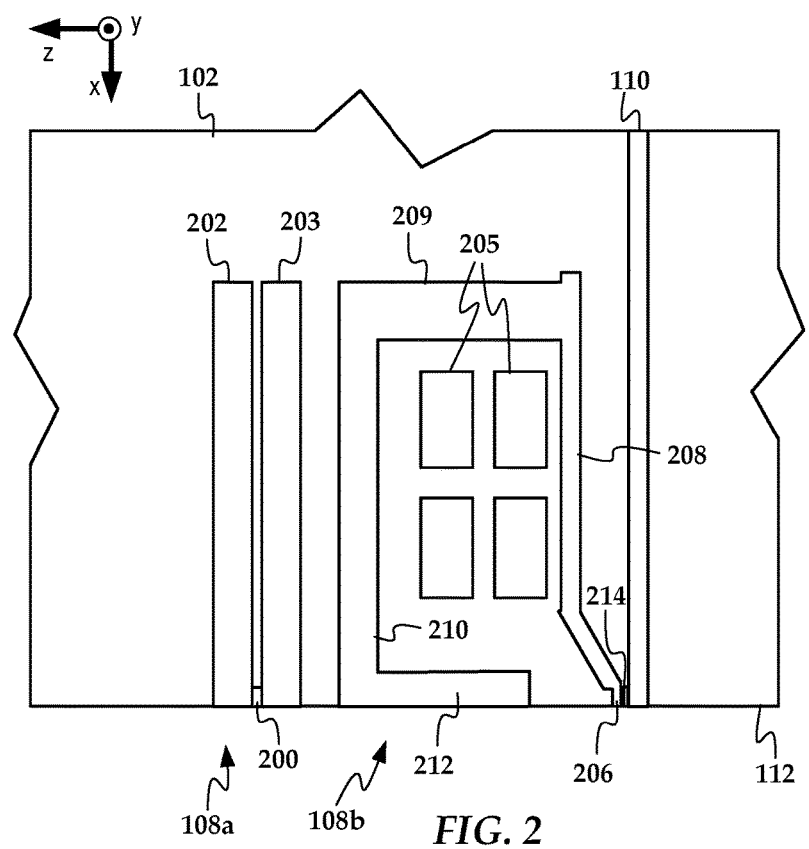
FIG. 2 is a cross-sectional view of read and write transducers according to example embodiments.

In FIG. 2, a cross-sectional view of a slider shows details of the read/write transducers 108 according to an example embodiment. A read transducer 108a includes a read element 200 (e.g., magnetoresistive stack) located between shields 202-203. A magnetic write transducer 108b includes a coil 205 that, when energized, induces magnetic flux through a write pole 206, yoke 208, 209, a return pole 210, and shield 212. A near-field transducer (NFT) 214 is located at the media-facing surface 112 proximate the write pole 206. Light propagating through the waveguide causes the NFT 214 to achieve surface plasmon resonance.

Figure 3:
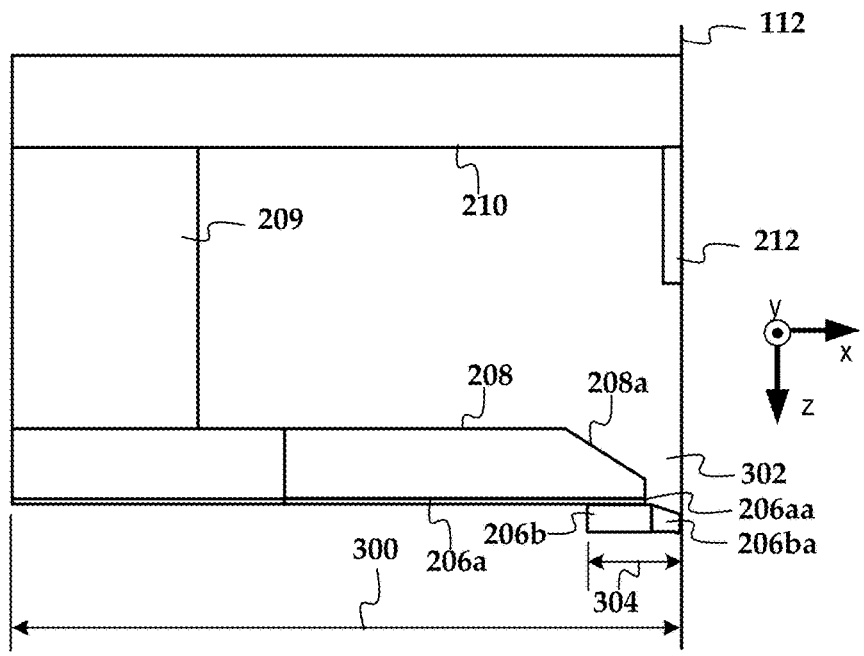
FIGS. 3 and 4 are respective side and perspective views of a magnetic write transducer according to an example embodiment.
Figure 4:
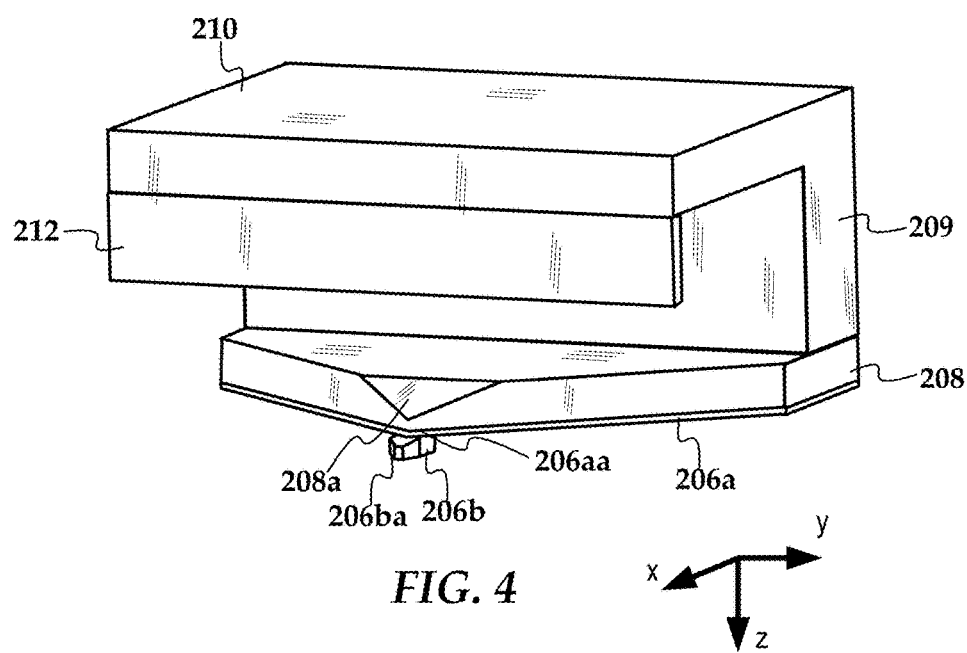

In FIGS. 3 and 4, respective side and perspective views show details of the magnetic write transducer 108a according to an example embodiment. As seen in these views, the write pole 206 has a first write pole section (WP1) 206a that tapers in a crosstrack direction and downtrack direction to form a tapered tip 206aa. The first write pole section 206a includes has a high-moment, seed layer on one substrate-parallel side facing the yoke 208. The first write pole section extends a first distance 300 away from the media-facing surface 112. A gap 302 is located between the tapered tip 206aa and the media-facing surface 112 and A second write pole section 206b coupled to first write pole section 206a. The second write pole section 206b extends a second distance 304 away from the media-facing surface 112. The second distance at least ⅕ that of the first distance 300. A tip 206ba of the second write pole section is proximate the media facing surface 112 and tapered in the crosstrack direction and the downtrack direction (y- and z-directions in this figure).

As best seen in FIG. 4, the yoke 208 and the first write pole section 206a have matching outlines on a substrate-parallel plane (the xy-plane in these views). Therefore yoke 208 tapers in the crosstrack direction in the same amount as the first write pole section 206a. The yoke 208 also includes a taper 208a that results in a narrowed downtrack dimension close to the tip 206aa of the first write pole section 206a.

Figure 5:
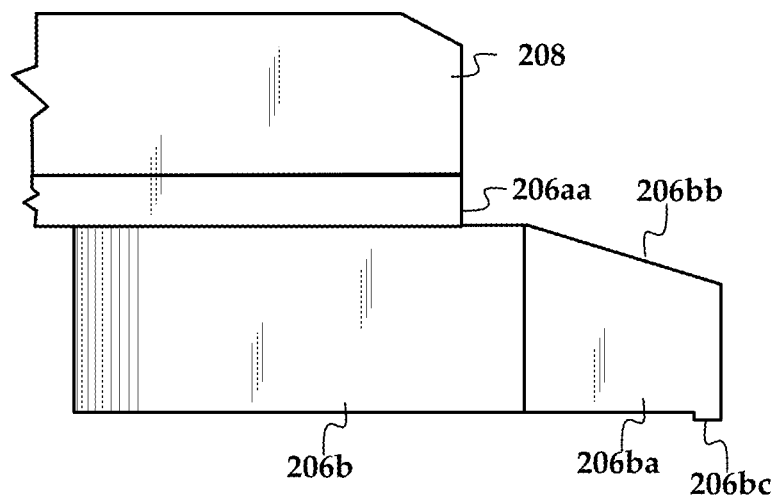
FIGS. 5 and 6 are respective side and perspective views of a write pole according to example embodiments.
Figure 6:
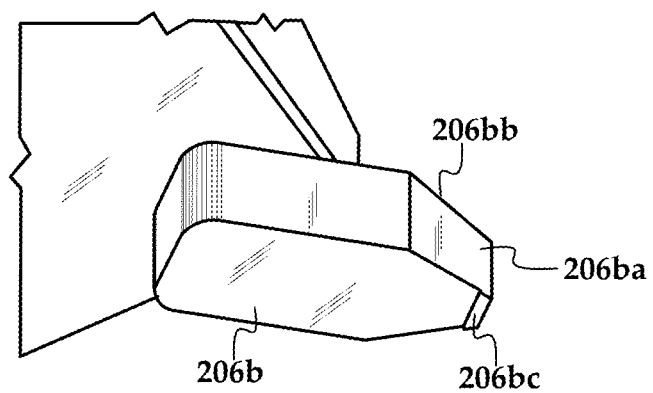

In FIGS. 5 and 6, respective side and perspective views show details of the second write pole section 206b according to an example embodiment. A top bevel 206bb increases field of the tapered tip 206ba. A step 206bc extends towards the near-field transducer and provides for increased heat-sinking of the near-field transducer 214. Details of the near-field transducer 214 are seen in the cross-sectional view of FIG. 7.

Figure 7A:
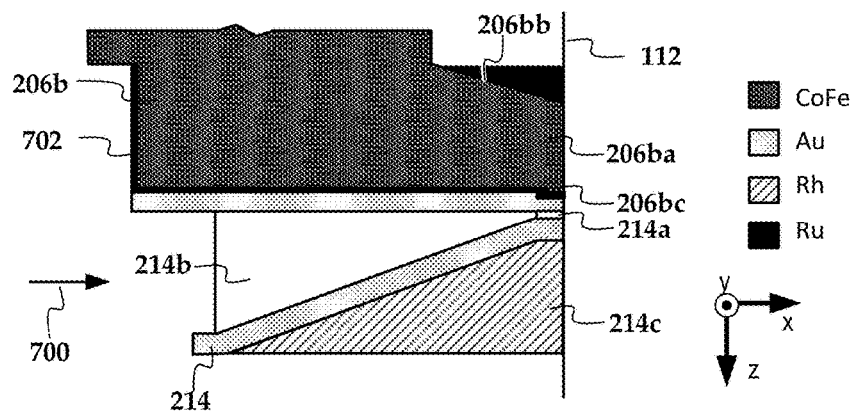
FIGS. 7A and 7B are a cross-sectional views of a write pole section and plasmonic gap waveguide according to an example embodiment.
Figure 7B:
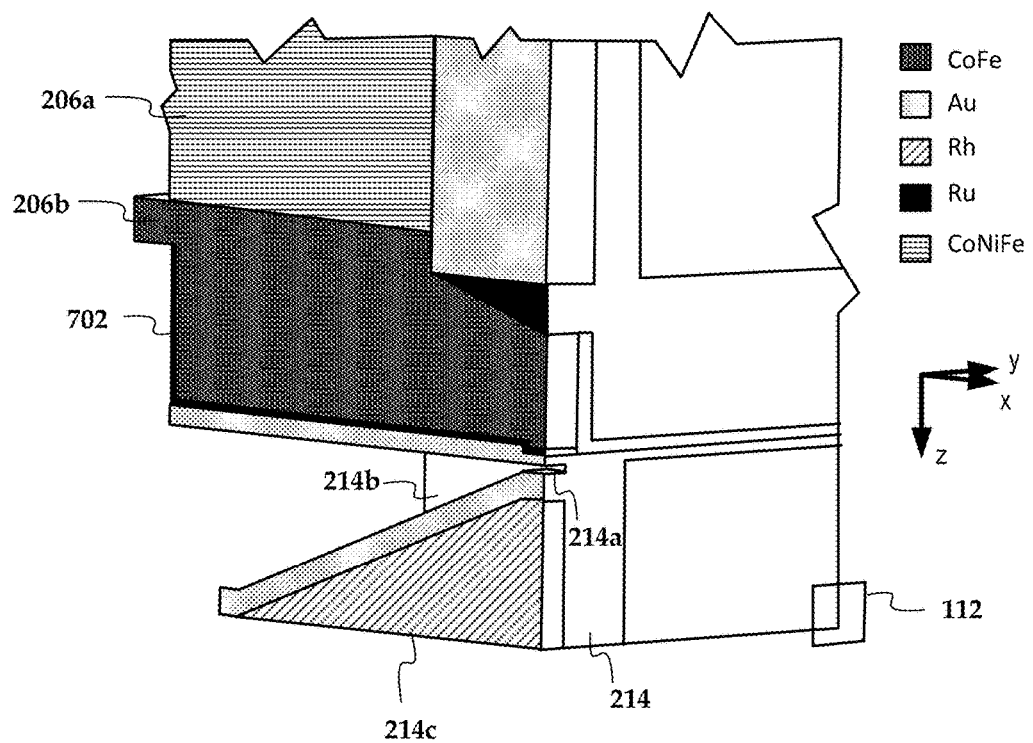

As seen in FIGS. 7A and 7B, the near-field transducer 214 is configured as a plasmonic gap waveguide, and may be referred interchangeable herein as a near-field transducer or plasmonic gap waveguide. The near-field transducer 214 has a gap 214a with first and second substrate-parallel sides offset downtrack from one another at the media-facing surface 112. A flared cavity 214b extends from the gap 214a away from the media-facing surface 112. Light, as indicated by arrow 700, is coupled from the waveguide (not shown) to the flared cavity 214b. The near-field transducer 214 also includes a block 214c of a thermally robust material (e.g., Rh) at the media-facing surface 112 downtrack from the gap 214a and away from the write pole portion 206b. A diffusion barrier 702 formed of Ru separates the near-field transducer 214 from the second write pole section 206b.

Figure 8:
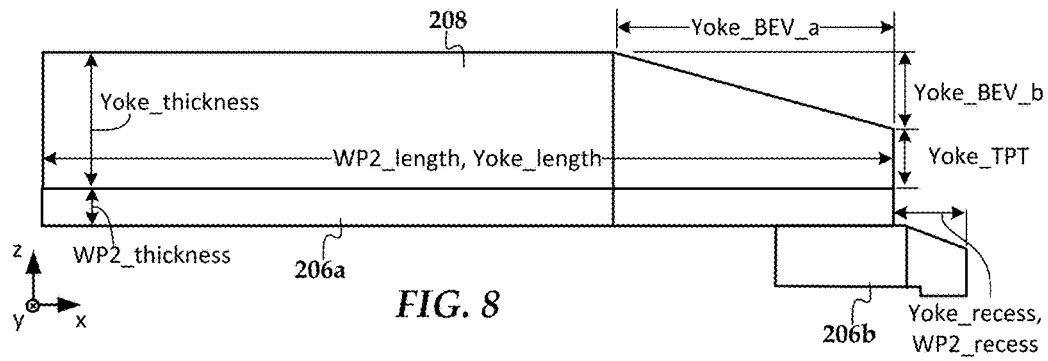
FIGS. 8-11 are plan views showing dimensions of a magnetic write transducer according to an example embodiment.
Figure 9:
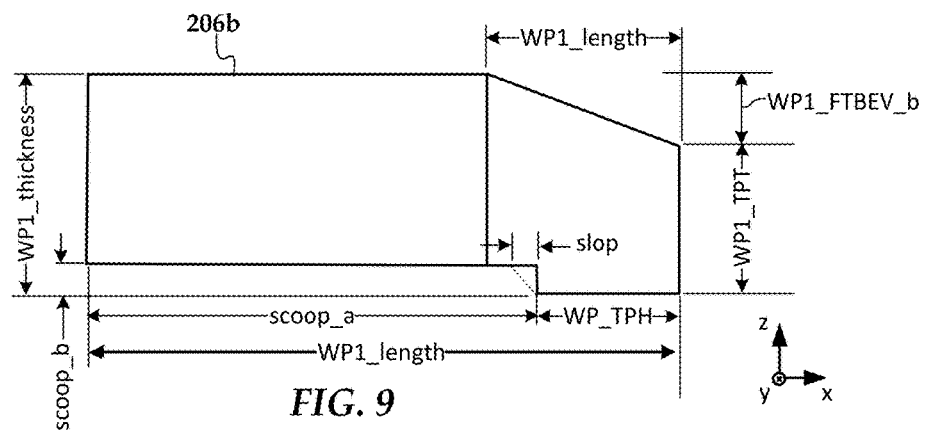
Figure 10:
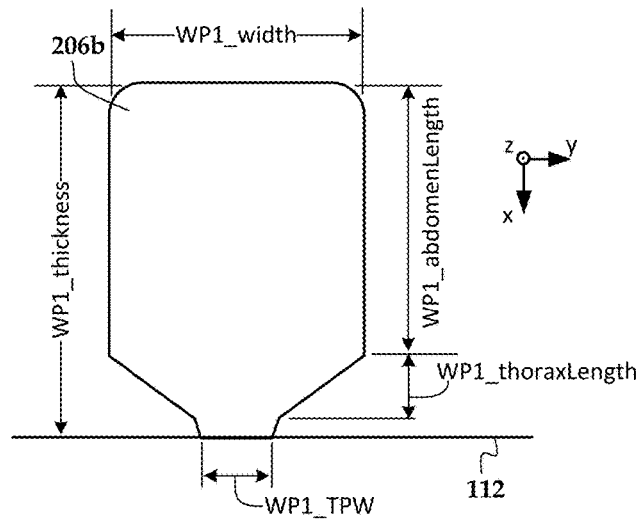
Figure 11:
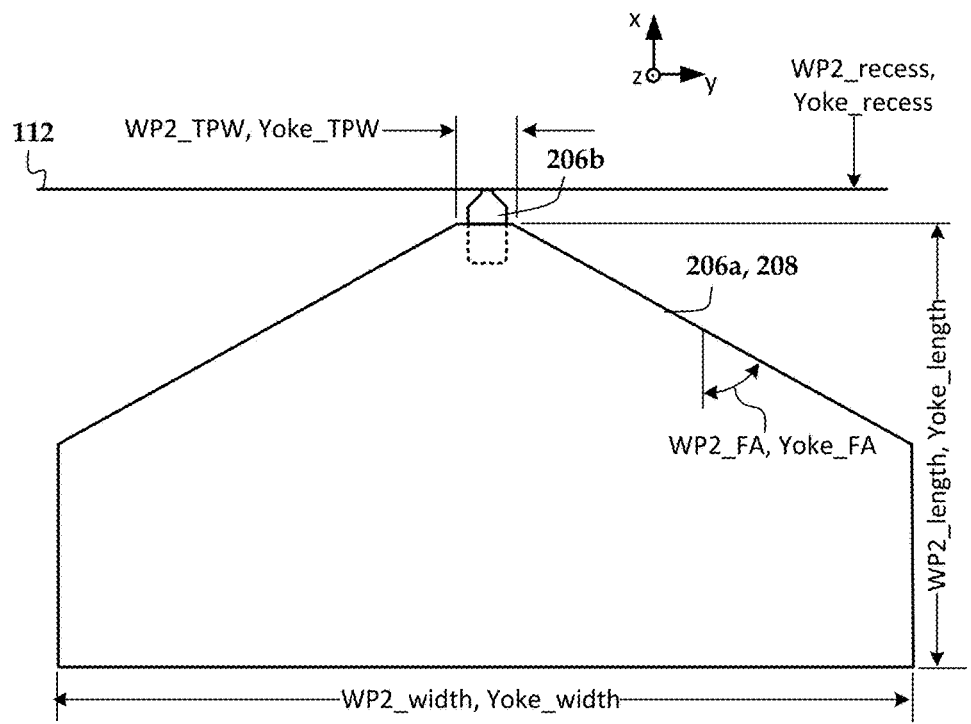

In FIGS. 8-9, side views show dimensions of the first and second write pole portions 206a-b and the yoke 208. In FIGS. 10 and 11, top view shows dimensions of these same components. In Tables 1-4 below, example values are provided for the dimensions shown in FIGS. 8-22, where WP2 refers to the first write pole portion and WP1 refers and second write pole portion.

TABLE 1

Dimensions shown in FIGS. 8-11

| Name | Units | Value) |
| --- | --- | --- |
| Yoke_thickness | nm | 750 |
| Yoke_BEV_a | nm | 1000 |
| Yoke_BEV_b | nm | 550 |
| WP2_length, Yoke_length | nm | 6900 |
| WP2_thickness | nm | 80 |
| WP2_recess, Yoke_recess | nm | 400 |
| WP1_length | nm | 1000 |
| WP1_thickness | nm | 300 |

TABLE 1-continued

Dimensions shown in FIGS. 8-11

| Name | Units | Value) |
| --- | --- | --- |
| WP1_FTBEV_a | nm | 300 |
| WP1_FTBEV_b | nm | 90 |
| WP1_scoop_a | nm | 950 |
| WP1_scoop_b | nm | 10 |
| WP2_recess, Yoke_recess | nm | 300 |
| WP2_length, Yoke_length | nm | 6900 |
| WP2_width, Yoke_width | nm | 10000 |
| WP2_FA, Yoke_FA | deg | 52 |

Figure 12:
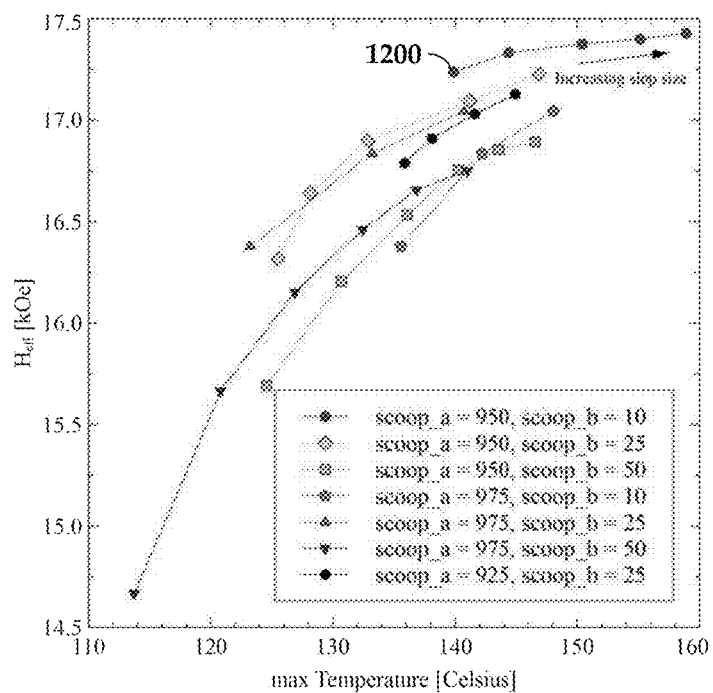
FIGS. 12 and 13 are graphs showing magnetic field and temperature of a write transducer according to example embodiments.

Analysis of the illustrated writer in FIGS. 3-11 shows effective field ($H_{eff}$) of 19.4 kOe at 80 mA of coil current and perpendicular field ($H_{perp}$) if 8.25 kOe at 80 mA. This represents an increase of effective field by as much as 28% over previous designs, and an increase in perpendicular field by as much as 33% over previous designs. In HAMR devices, the perpendicular field is believed to have the greatest impact on performance. In FIG. 12, a graph shows the variation in effective field and maximum temperature for different values of scoop_a, scoop_b, and slop shown in FIG. 9. The "slop" value indicates how angled the step 206bc where it extends from the second write pole section 206b. A value of slop=0 indicates that this intersection is a right angle. Note that for each set of points with the same scoop_a and scoop_b values, slop increases from left to right. At point 1200, slop=10 and this represents a good compromise between high field and low temperature.

Figure 13:
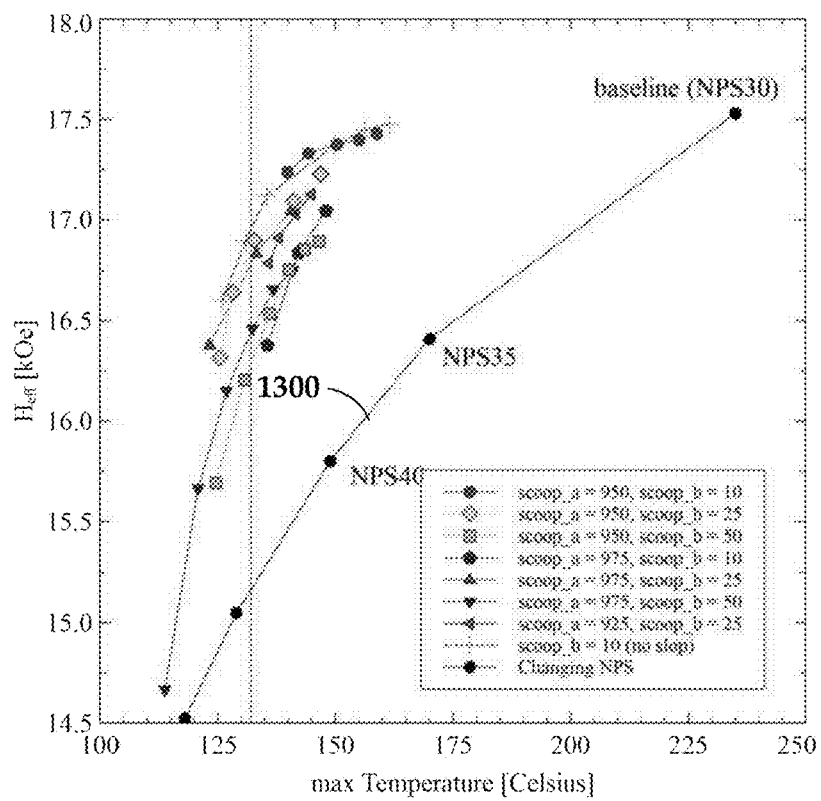

In FIG. 13, a graph shows how decreasing the downtrack separation between the pole and the NFT affects temperature and effective field. This graphs shows performance of a baseline configuration, in which scoop_a=scoop_b=0. As indicated by the baseline curve 1300, the cutout that forms step 206bc enables a combination of high field and low temperature that cannot otherwise be obtained with this configuration.

Figure 14:
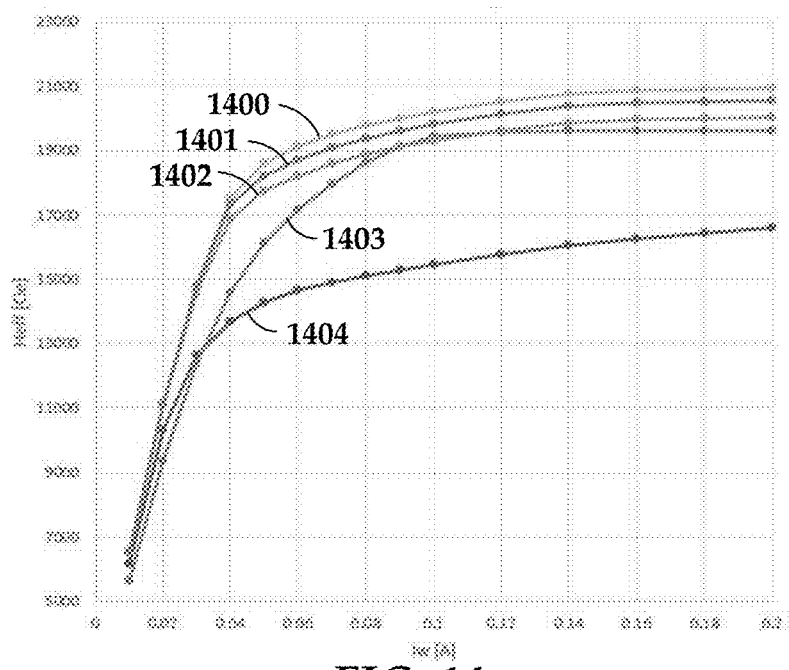
FIGS. 14 and 15 are saturation curves of a write transducer according to example embodiments.
Figure 15:
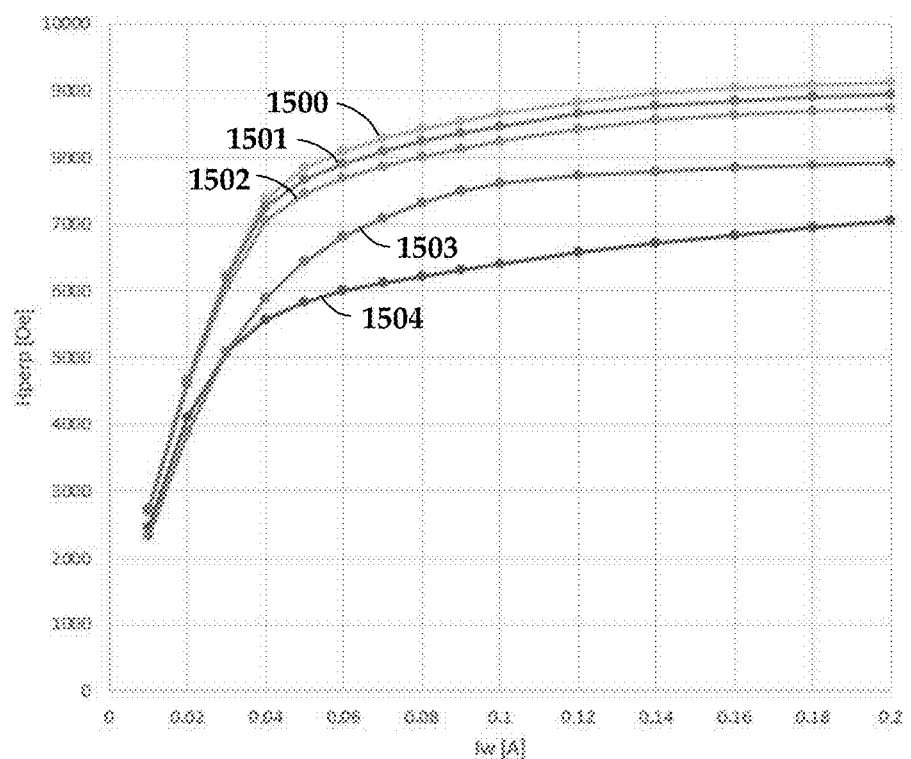

In FIGS. 14 and 15, saturation curves show performance of various configurations of the write transducer described above. Curves 1400 and 1500 are for scoop_b=0; curves 1401 and 1501 are for the same design at 130° C.; curves 1402 and 1502 are for the same design at 145° C.; and curves 1403, 1404, 1503, and 1504 are for other designs currently in use. The illustrated embodiments saturate at a lower current than the previous designs, and so are likely well suited to higher data rates.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head, comprising:
   a plasmonic gap waveguide comprising first and second substrate-parallel sides offset downtrack from one another at a media-facing surface of the recording head; and
   a magnetic write transducer proximate the first substrate-parallel side of the plasmonic gap waveguide, the magnetic write transducer comprising:
      a first write pole section that tapers in a crosstrack direction and downtrack direction to form a tapered tip, the first write pole section extending a first distance away from the media-facing surface, a gap located between the tapered tip and the media-facing surface; and
      a second write pole section coupled to the first write pole section, the second write pole section extending a second distance away from the media-facing surface, the second distance being at least ⅕ that of the first distance, a tip of the second write pole section proximate the media-facing surface and tapered in the crosstrack direction and the downtrack direction.

2. The recording head of claim 1, wherein the first write pole section has a first crosstrack width away from the tapered tip that is at least 10 times larger than a corresponding second crosstrack width of the second write pole section that is away from the tip of the second write pole section.

3. The recording head of claim 1, wherein the first write pole section comprises a high-moment, seed layer on one substrate-parallel side.

4. The recording head of claim 3, wherein the magnetic write transducer further comprises a yoke facing the seed layer of the first write pole section, wherein an outline of the yoke on a substrate-parallel plane matches a corresponding outline of the first write pole section on the substrate-parallel plane.

5. The recording head of claim 4, wherein the yoke further comprise a taper that results in a narrowed downtrack dimension close to the tapered tip of the first write pole section.

6. The recording head of claim 1, wherein the tip of the second write pole section comprises a step that extends towards the plasmonic gap waveguide, the step providing heat sinking for the plasmonic gap waveguide.

7. The recording head of claim 1, wherein the plasmonic gap waveguide comprises a flared cavity that extends from the gap in a direction away from the media-facing surface.

8. The recording head of claim 7, wherein the plasmonic gap waveguide comprises a block of thermally robust material downtrack from the gap facing away from the magnetic write transducer.

9. The recording head of claim 1, further comprising a diffusion barrier between the plasmonic gap waveguide and the second write pole section.

10. A recording head, comprising:
   a plasmonic gap waveguide comprising first and second substrate-parallel sides offset downtrack from one another at a media-facing surface of the recording head; and
   a magnetic write transducer proximate the first substrate-parallel side of the plasmonic gap waveguide, the magnetic write transducer comprising:
      a first write pole section that tapers in a crosstrack direction and downtrack direction to form a tapered tip, the first write pole section extending a first distance away from the media-facing surface, a gap being located between the tapered tip and the media-facing surface; and
      a second write pole section coupled to the first write pole section, a tip of the second write pole section proximate the media-facing surface and tapered in the crosstrack direction and the downtrack direction, the tip of the second write pole section comprising a step that extends towards the plasmonic gap waveguide.

11. The recording head of claim 10, wherein second write pole section extends a second distance away from the media-facing surface, the second distance being at least ⅕ that of the first distance.

12. The recording head of claim 10, wherein the first write pole section has a first crosstrack width away from the tapered tip that is at least 10 times larger than a corresponding second crosstrack width of the second write pole section that is away from the tip of the second write pole section.

13. The recording head of claim 10, wherein the first write pole section comprises a high-moment, seed layer on one substrate-parallel side.

14. The recording head of claim 13, wherein the magnetic write transducer further comprises a yoke facing the seed layer of the first write pole section, wherein an outline of the yoke on a substrate-parallel plane matches a corresponding outline of the first write pole section on the substrate-parallel plane.

15. The recording head of claim 14, wherein the yoke further comprise a taper that results in a narrowed downtrack dimension close to the tapered tip of the first write pole section.

16. The recording head of claim 10, wherein the plasmonic gap waveguide comprises a flared cavity that extends from the gap in a direction away from the media-facing surface.

17. The recording head of claim 16, wherein the plasmonic gap waveguide comprises a block of thermally robust material downtrack from the gap facing away from the magnetic write transducer.

18. The recording head of claim 10, further comprising a diffusion barrier between the plasmonic gap waveguide and the second write pole section.

19. A recording head, comprising:
   a plasmonic gap waveguide comprising first and second substrate-parallel sides offset downtrack from one another at a media-facing surface of the recording head; and
   a magnetic write transducer proximate the first substrate-parallel side of the plasmonic gap waveguide, the magnetic write transducer comprising:
      a first write pole section that tapers in a crosstrack direction and downtrack direction to form a tapered tip, the first write pole section comprising a high-moment, seed layer on one substrate-parallel side, the first write pole section extending a first distance away from the media-facing surface, a gap located between the tapered tip and the media-facing surface; and
      a second write pole section coupled to the first wiite pole section, the second write pole section extending a second distance away from the media-facing surface, the second distance at least ⅕ that of the first distance, a tip of the second write pole section proximate the media-facing surface and tapered in the crosstrack direction and the downtrack direction, the tip of the second write pole section comprising a step that extends towards the plasmonic gap waveguide.

* * * * *